US011999032B2

(12) United States Patent
Schwartzkopf

(10) Patent No.: US 11,999,032 B2
(45) Date of Patent: Jun. 4, 2024

(54) CLIP STARTER GUIDE AND RELATED METHOD OF USE

(71) Applicant: National Nail Corp., Grand Rapids, MI (US)

(72) Inventor: Todd E. A. Schwartzkopf, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

(21) Appl. No.: 17/879,311

(22) Filed: Aug. 2, 2022

(65) Prior Publication Data

US 2024/0042584 A1 Feb. 8, 2024

(51) Int. Cl.
*B25B 23/00* (2006.01)
*B25B 23/10* (2006.01)

(52) U.S. Cl.
CPC ............ *B25B 23/005* (2013.01); *B25B 23/10* (2013.01)

(58) Field of Classification Search
CPC ..... B25B 23/005; B25B 23/10; B25B 21/007; B25B 11/02; Y10T 29/49895; F16B 39/10; F16B 5/004; F16B 5/0084; F16B 5/0208; F16B 5/0635; F16B 5/128; F16B 21/18; F16B 37/02; F16B 37/04; F16B 39/08; F16B 39/14; F16B 12/10; B23P 19/006; E04F 2201/0594; E04F 2201/023; E04F 2015/02088; E04F 2015/02094; B25C 3/006; B25F 1/00
USPC ............. 81/57.37, 431, 13, 55, 44; 411/190, 411/516–517, 520, 522–523, 103
See application file for complete search history.

(56) References Cited

U.S. PATENT DOCUMENTS

| | | | | |
|---|---|---|---|---|
| 797,078 | A | 8/1905 | Shelton | |
| 2,946,060 | A * | 7/1960 | Powers | A47C 31/06 227/151 |
| 3,604,488 | A | 9/1971 | Wishart et al. | |
| 3,965,950 | A | 6/1976 | MacDonald | |

(Continued)

FOREIGN PATENT DOCUMENTS

| | | |
|---|---|---|
| DE | 202014006016 | 10/2023 |
| EP | 0338554 | 10/1989 |

(Continued)

OTHER PUBLICATIONS

Trex (Amazon, Home Depot, and YouTube), selected page snapshots. (Year: 2022).*

*Primary Examiner* — Steven M Cernoch
*Assistant Examiner* — Steven Huang
(74) *Attorney, Agent, or Firm* — Warner Norcross + Judd LLP

(57) ABSTRACT

A clip fastener guide is provided including an upward opening funnel, a barrel and a guide base. The guide base can include a handle including a grasping surface configured so a user can grasp and manipulate the guide, and can define a guide recess disposed below the elongated barrel. A clip can include a clip base, a clip wall extending upward from the clip base, and a clip arm that extends from the clip wall over the clip base. The clip base can be disposed in the guide recess, and can define a fastener hole, the fastener hole aligned with the elongated barrel. The handle can be graspable by a user to impair rotation of the clip as the clip is installed relative to a workpiece. Related methods of use are provided.

16 Claims, 14 Drawing Sheets

(56) References Cited

U.S. PATENT DOCUMENTS

| | | | | |
|---|---|---|---|---|
| 5,014,897 | A * | 5/1991 | Uuskallio | B25C 7/00 227/139 |
| 5,025,968 | A * | 6/1991 | Nasiatka | B25C 5/16 227/31 |
| 5,083,483 | A | 1/1992 | Takagi | |
| 5,243,804 | A | 9/1993 | Therrien et al. | |
| 5,368,214 | A * | 11/1994 | Schick | F16G 3/16 227/155 |
| D357,175 | S | 4/1995 | Godfrey | |
| 5,927,163 | A | 7/1999 | Habermehl | |
| 6,601,480 | B1 | 8/2003 | Habermehl | |
| D485,160 | S | 1/2004 | Pelc | |
| D600,105 | S | 9/2009 | Harris | |
| 8,955,210 | B2 | 2/2015 | Vandenberg | |
| 9,360,036 | B2 | 6/2016 | Waterman et al. | |
| D792,757 | S | 7/2017 | Brigham et al. | |
| D821,853 | S | 7/2018 | Mikkelsen | |
| 10,427,279 | B2 | 10/2019 | Rensburg | |
| 10,494,820 | B1 | 12/2019 | Chen | |
| 10,576,612 | B2 | 3/2020 | Vandenberg | |
| D906,098 | S | 12/2020 | Chen | |
| 11,161,226 | B2 | 11/2021 | Sawa | |
| 2002/0121064 | A1 | 9/2002 | Erwin | |
| 2004/0003682 | A1* | 1/2004 | Nanaumi | B25B 23/005 81/13 |
| 2005/0063771 | A1 | 3/2005 | Harris | |
| 2006/0059822 | A1* | 3/2006 | Guffey | F16B 12/125 52/480 |
| 2010/0083610 | A1 | 4/2010 | King | |
| 2010/0205895 | A1* | 8/2010 | Orchard | E04F 15/02 52/712 |
| 2013/0104493 | A1 | 5/2013 | Orchard | |
| 2014/0001228 | A1* | 1/2014 | Shadwell | B25C 7/00 227/151 |
| 2016/0362902 | A1 | 12/2016 | Lee et al. | |
| 2017/0044776 | A1 | 2/2017 | Rodriguez Lopez | |
| 2019/0071880 | A1 | 3/2019 | Demuth et al. | |
| 2019/0211856 | A1 | 7/2019 | Getsiv | |
| 2019/0360214 | A1 | 11/2019 | Vandenberg et al. | |
| 2020/0354951 | A1* | 11/2020 | Aquilani | E04F 15/02044 |
| 2021/0277668 | A1 | 9/2021 | Vandenberg et al. | |
| 2021/0388622 | A1* | 12/2021 | Vernon | E04F 15/02044 |
| 2022/0010825 | A1 | 1/2022 | Voß | |
| 2023/0264330 | A1* | 8/2023 | Hurst | B25B 31/00 52/747.1 |

FOREIGN PATENT DOCUMENTS

| | | |
|---|---|---|
| EP | 0596669 | 5/1994 |
| EP | 0863317 | 9/1998 |
| EP | 2939790 | 11/2015 |
| GB | 846337 | 8/1960 |
| GB | 6116267 | 1/2021 |
| GB | 6245352 | 12/2022 |
| JP | D1413654 | 5/2011 |
| JP | D1499741 | 6/2014 |
| KR | 300595365.0000 | 4/2011 |
| TW | 200170-001 | 10/2019 |
| WO | 201700962 | 1/2017 |
| WO | D203548-001 | 11/2019 |

* cited by examiner

CLIP STARTER GUIDE AND RELATED METHOD OF USE

BACKGROUND OF THE INVENTION

The present invention relates to tools, and more particularly to a construction tool and related method used to guide a fastener relative to a clip to facilitate installation of the fastener and clip with the tool relative to a workpiece.

In the construction industry, there are many tools used to guide fasteners relative to a work piece. One example of a popular and durable tool is the CAMO® Never-Miss Guide, available from National Nail Corp of Wyoming, Michigan. This tool is designed to efficiently guide a tool drive toward a fastener to secure the fastener and a board to an underlying structure. The fasteners are commonly referred to as "hidden fasteners" because they are generally hidden from view after installation with the tool.

Some hidden fasteners can be difficult to install due to their diminutive size and the location where they are installed. Where the fasteners are installed in crevices between boards, it can be difficult to mate and align the tool with the fastener to start the installation process. The Never-Miss Guide can assist in this alignment, however, it does not prevent rotation of the hidden fasteners because it is primarily dedicated to guiding a screw or a tool drive toward that screw. Further, this guide is not well suited to install starter clips on boards because of its size and configuration. In addition, this guide will not prevent rotation of starter clips where a fastener bites into the clips and rotates them. On a large job, where many starter clips are installed and advanced into multiple work pieces, these issues can be compounded, and can add time and labor cost to the job.

Accordingly, there remains room for improvement in the field of tools used to guide fasteners, and in particular, a guide that can align a tool and/or a fastener with a clip to properly and consistently engage the clip, as well as impair rotation of that clip relative to a workpiece.

SUMMARY OF THE INVENTION

A clip and fastener guide is provided including an upward opening funnel, a barrel and a guide base. The guide base can include a handle including a grasping surface configured so a user can grasp and manipulate the guide, and can define a guide recess disposed below the elongated barrel, the guide recess configured to receive a clip. The handle can be graspable by a user to impair rotation of the clip, located in the guide recess, as the clip is installed relative to a workpiece.

In one embodiment, the clip can include a clip base, a clip wall extending upward from the clip base, and a clip spring arm that extends from the clip wall over the clip base. When the clip is installed relative to a grooved board, it is this clip spring arm that typically is placed within a groove on the board. The clip base can be disposed in the guide recess, and can define a fastener hole. The fastener hole can be aligned with the elongated barrel.

In another embodiment, the clip spring arm can be located above the base so that a portion of the guide base is disposed between the clip base and the clip arm when the clip is installed relative to the guide.

In still another embodiment, the guide can include a pin projecting from the guide base. The clip can define a pin hole. The clip can be installed on or mounted to the guide so that the pin extends through the pin hole defined by the clip.

The pin can exert a force against the clip to urge the clip base into the guide recess. This can retain the clip in an installed mode relative to the guide.

In yet another embodiment, the guide can include a flexible finger. This flexible finger, sometimes referred to as a pin, can be positioned under the clip spring arm of the clip. The finger can push upward with a force on the clip spring arm when the clip is installed relative to the guide. The clip base can be lifted via a transfer of this force until it moves within the guide recess and optionally engages or contacts a guide recess wall within the guide recess. The transferred force can maintain the clip base within the guide recess and the clip joined with the guide.

In even another embodiment, when a fastener is installed via the guide, the fastener can engage the clip, for example, part of the clip around the fastener hole, and pull or otherwise urge the clip down onto a surface of an underlying substrate or workpiece, such as an underlying joist or other structure. The finger generating the force can flex downward to allow the clip to move with the fastener form the guide. When the fastener is fully inserted, the guide can be pulled or moved relative to the clip, or away from the clip, and the finger can slide relative to the clip spring arm and return to its natural position, readied for engagement with a subsequent clip to be installed relative to the guide.

In a further embodiment, the flexible finger of the guide can be a separate, pivoting arm joined with and moveable relative to the base. The pivoting arm can selectively engage the clip spring arm, and retain the clip relative to the guide.

In still a further embodiment, the guide can include a wall recess that transitions to the guide recess, where the wall recess is defined by the guide base. The wall recess can be bounded by a perimeter, and one or more arms can extend inward from the perimeter of the wall recess. When the clip is installed relative to the base, the clip wall can enter the wall recess and the arms there can be biased, which in turn exerts a responsive force on the clip wall. This responsive force can maintain the clip in a mounted relation to the guide base, and can generally secure the clip to the guide for an installation procedure.

In yet a further embodiment, a method of using the fastener guide is provided. The method can include providing a guide including an upward opening funnel with an elongated barrel defining a fastener bore extending downward from the upward opening funnel, the guide base including a handle extending from the base and including a grasping surface configured so a user can grasp and manipulate the guide, the guide base defining a guide recess disposed below the elongated barrel, and a retention element; and installing a clip on the guide so that a clip base enters the guide recess, the clip including a clip wall extending upward from the clip base, the clip wall joined with a clip arm that extends over the clip base, the clip base defining a fastener hole, the fastener hole aligned with the fastener bore, whereby the handle is graspable by a user to impair rotation of the clip as the clip is installed relative to a workpiece.

In even a further embodiment, the method can include providing a pin hole in the clip wall; and projecting a pin through the pin hole to exert a force on the clip and retain the clip on the guide with the clip base disposed in the guide recess. The force can be an upward force exerted on a perimeter of the pin hole that urges the clip base into the guide recess and against a recess wall within the guide recess.

In a further embodiment, the method can include installing a fastener in the upward opening funnel so that the fastener falls under the force of gravity into the fastener bore and projects downward into the fastener hole defined by the clip base; and rotating the fastener so that the fastener enters a workpiece, with a head of the fastener drawing the clip base against the workpiece.

In still a further embodiment, the method can include rotating a fastener in the elongated barrel so that the fastener forces the clip base against a workpiece; and holding the handle of the guide so that the clip is impaired from rotating with the fastener while the fastener is rotated.

In yet a further embodiment, the method can include placing a fastener in the funnel so that the fastener projects at least partially through the fastener hole defined by the clip base; rotating the fastener so that the fastener advances into a workpiece; engaging a perimeter of the clip base around the fastener hole so that the clip is secured to the workpiece; and sliding the guide base relative to the clip secured to the work piece laterally so that the clip exits the guide recess and the guide is removed from the clip, fastened to the workpiece with the fastener.

The fastener guide and methods of the current embodiments herein can enhance and facilitate installation of a clip relative to a work piece, and can impair inadvertent rotation or misalignment of the clip relative to the work piece or a subsequently installed board. Where the guide includes the funnel, a user can quickly align a fastener with a fastener hole in the clip and install the fastener relative to the clip. Where the guide includes a guide base having a guide recess within which the clip seats, the guide can prevent or impair rotation and misalignment of the clip relative to the work piece or a board later installed. The clip also can allow a user to subsequently move and reorient the clip after the fastener is installed in some cases. Where the guide includes a handle, a user can easily place and manipulate the clip. Where the guide includes a retention element, that element can secure the clip to the guide base and guide in general, allowing the clip enhanced mobility and orientation characteristics.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
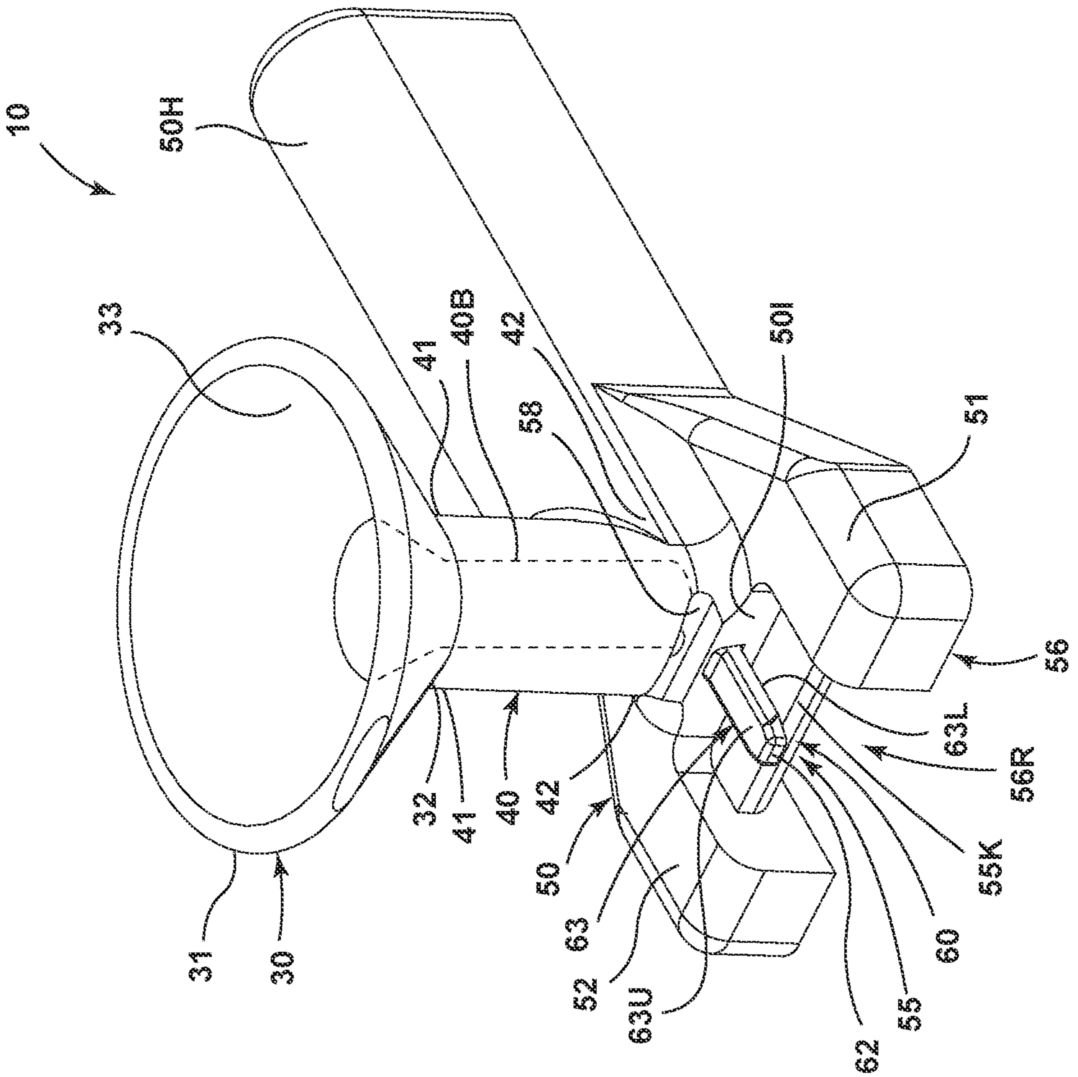
FIG. 1 is a perspective view of a fastener guide of a current embodiment.

A starter clip fastener guide of a current embodiment is shown in FIGS. 1-10 and generally designated 10. The guide 10 can include an upward opening funnel 30 having an upper end 31 and a lower end 32. The upward opening funnel 30 can become larger in dimension as the distance from the elongated barrel 40 increases. Generally, the upward opening funnel 30 can open in an upward direction away from the elongated barrel. The upward opening funnel 30 can be configured to enable a fastener 100 or drive feature 90 of a drive tool to quickly and efficiently ride along an interior wall 33 of that funnel 30 and into the elongated barrel 40, where the tool can register with and engage a head 100H of a fastener 100 as shown for example in FIGS. 4 and 5.

The guide 10 can include a guide base 50 joined with the elongated barrel 40. This guide base 50 can optionally include a handle 50H extending from the guide base with a grasping surface 50G configured so that a user can grasp and manipulate the guide to place a starter or other clip 70 relative to a workpiece 106. The guide base 50 can include a guide recess 55 disposed below and aligned with the elongated barrel 40. The clip 70 can be joined with the guide 10. The clip 70 can include a clip base 71 to which a clip wall 72 is joined and optionally extends upward from the clip base 71. The clip wall 72 can be further joined with a clip arm 73 that optionally can extend over a portion of the clip base 71 as described below. The clip base 71 can define a fastener hole 71H. The clip 70 can be installed relative to the guide base 50, optionally with the clip base 71 disposed in the guide recess 55. With this registration, the fastener hole 71H can be aligned with the elongated barrel 40 and generally with the fastener bore 40B defined by the elongated barrel 40.

Figure 2:
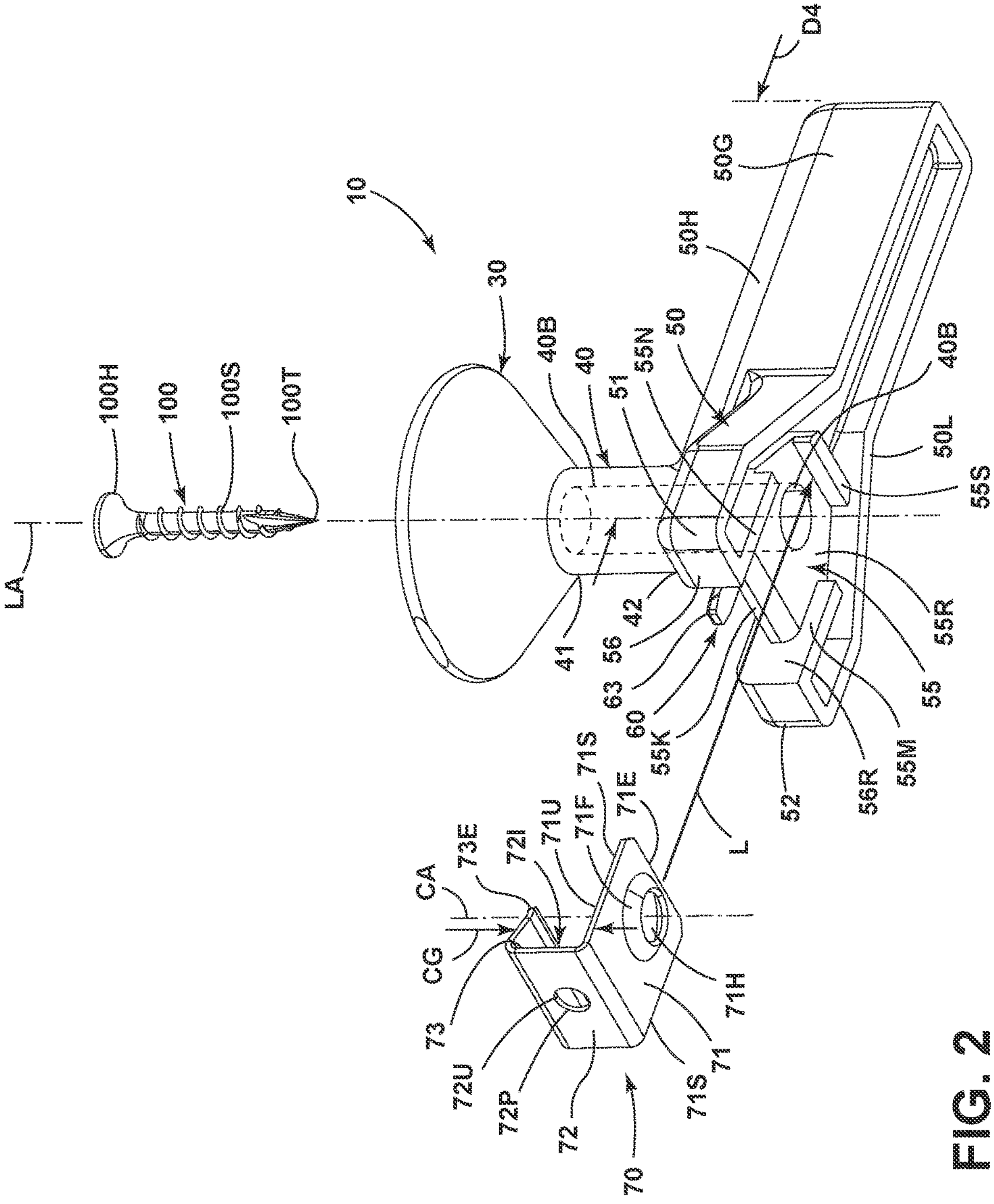
FIG. 2 is a bottom perspective view of the fastener guide with a clip about to be installed relative thereto, and a fastener adjacent a funnel of the fastener guide.
Figure 3:
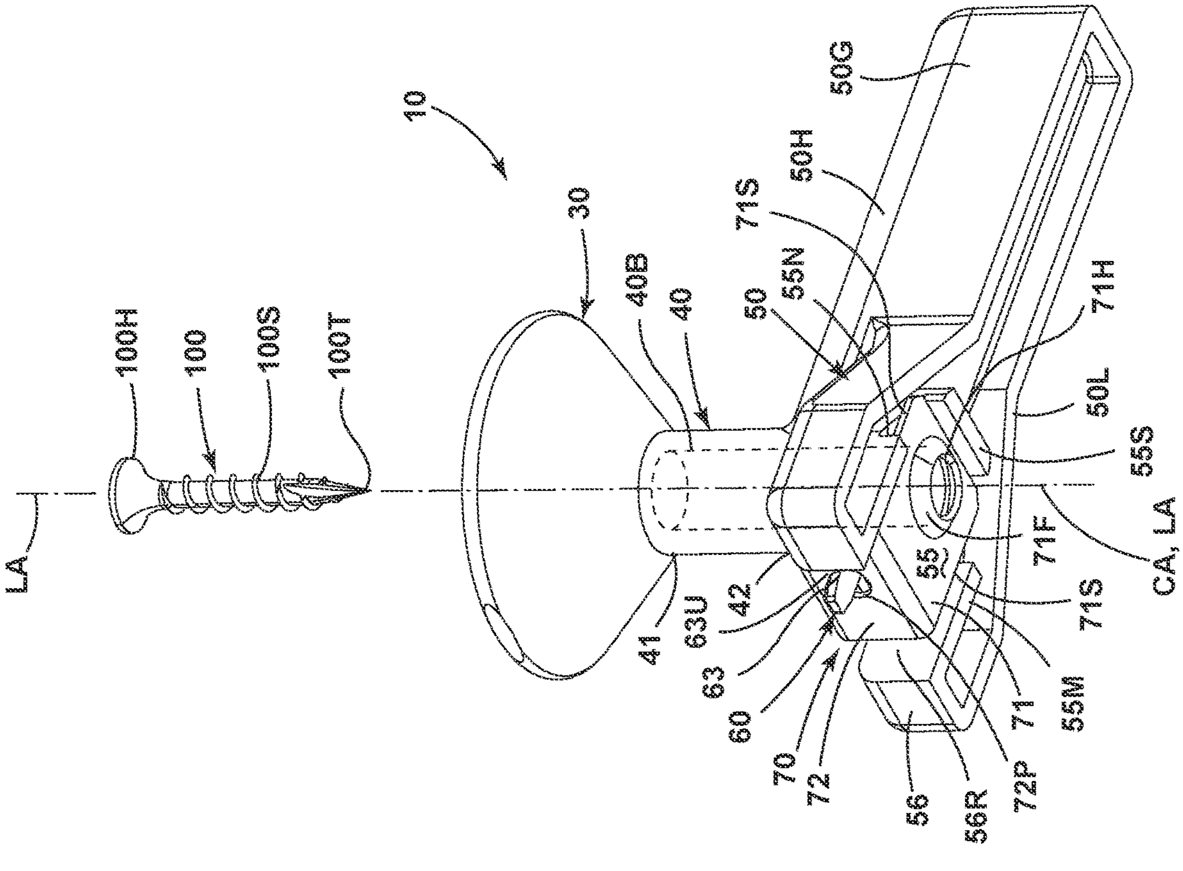
FIG. 3 is a bottom perspective view of the fastener guide with a clip installed relative thereto, and a fastener adjacent a funnel of the fastener guide.

In use, the clip 70 can be installed relative to the guide 10 and, in particular the guide base 50, by inserting the clip 70 into the guide recess 55 shown in FIGS. 2 and 3. After the clip 70 is installed relative to the guide base 50, the guide 10 can be installed and placed adjacent, for example, atop, a joist, substrate or other workpiece 106. The guide 10 can position the clip base 71 of the clip 70 adjacent an upper surface 106U of the workpiece 106. The guide 10 also can optionally place the clip a distance D1 away from an adjacent wall, structure or second workpiece 107. After appropriate placement, the guide 10 can facilitate placement of a fastener 100 in alignment with the fastener hole 71H of the clip, as well as advancement of a drive feature 90 relative to the fastener 100, such that the fastener 10 can be advanced through that fastener hole 71H. The fastener tip 100T can penetrate the upper surface 106U of the workpiece 106 and advance into the structure of the workpiece 106 while rotating. The head 100H of the fastener 100 can engage the clip base 71 or some other portion of the clip 70, drawing the clip 70 toward the upper surface 106U of the workpiece 106 and thereby attaching the clip to the joist 106.

During rotation of the drive feature 90 and thus the fastener 100, the fastener 100 can exert a torque or rotational moment M on the clip 70. The clip 70, however, is retained via the clip base 71 in the guide recess 55 and generally in the guide base 50 to counter this torque or rotational moment M, optionally with the aid of a user U holding and grasping the handle 50H of the guide 10. Accordingly, the clip 70 can be quickly and easily oriented and installed relative to the workpiece 106, while solidly holding the clip 70 in place so it does not spin as the moment M is exerted on the clip by the fastener 100 rotating relative to the clip 70, guide 10 and workpiece 106.

For purposes of illustration, the current embodiment of the guide 10 is described in connection with a clip fastener guide to which a clip 70 can be temporarily secured in place relative to a workpiece 106 before installation of the clip to the workpiece. The guide 10 also can guide the fastener 100 relative to the clip 70 optionally through a hole 71H of the clip as a drive feature is guided toward and advances the fastener 100 into a workpiece 106. The workpiece 106 can be in the form of a joist, board, beam, panel, sheet, floor, wall or other substrate, however, workpiece also can refer to other types of substrates and structures, not limited to wood, composite, metal, polymeric or other types of workpieces. Further, although the guide 10 is described in connection with attaching a starter clip to a joist, generally in the construction industry, the fastener guide can be used in a variety of other applications and industries where any type of similar clip is attached to a substrate.

Figure 4:
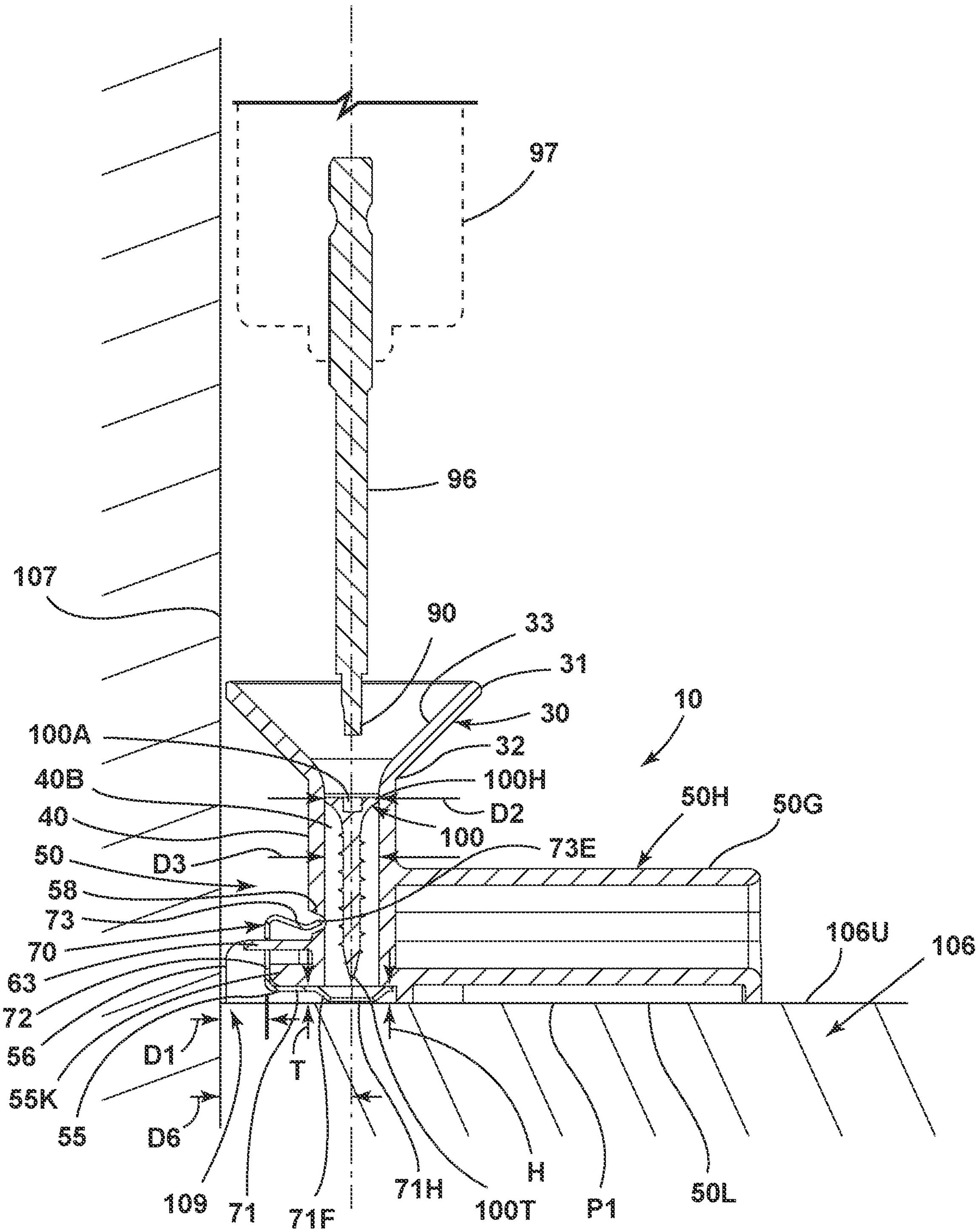
FIG. 4 is a side section view of the fastener guide with a clip installed relative thereto, and a fastener in a funnel and elongated barrel of the fastener guide before advancing into an underlying substrate.

The fastener 100 described herein can be a rotatable fastener, including but not limited to a screw, having a head 100H and a shank 100S, where the shank includes one or more threads to assist in advancing and pulling the remainder of the fastener 100 into an underlying workpiece. The fastener 100 can extend to a tip 100T which can be sharpened to a point and can facilitate penetration of the workpiece 106 by the fastener. As mentioned above, the fastener 100 can include a head 100H. This head 100H can be of a dimension, such as a diameter D2, that is sized slightly smaller than a diameter D3 of the elongated barrel 40 as shown in FIG. 4. This is so that the head 100H can consistently enter the elongated barrel 40 and slide or move therethrough, optionally while rotating. The diameter D3 can be slightly larger than D2, but not too large, so that the barrel can rotationally constrain the head by the head rotating within and sliding along the sidewall of the elongated barrel as the fastener is rotated. The head 100H of the fastener can include and/or define a drive, which optionally can be a hexalobular drive hole, a Phillips drive hole, a flat screwdriver drive hole, a hex key drive hole, a bolt head, or any other type of drive that is able to be engaged by a corresponding drive feature 90 of a tool 97.

The drive feature 90 used in conjunction with the current embodiment of the guide 10 as mentioned above can take on a variety of configurations. Generally, the drive feature can be joined with and/or form a portion of an elongated bit 96. The bit can be installed in relation to the tool 97, for example, a chuck of the tool, to facilitate the securement of the bit 96 to the tool 97. The tool 97 can be an electric drill, a battery-powered drill, or any other type of tool capable of rotating a bit 96 and/or some type of drive feature 90.

With further reference to FIGS. 1-5, the construction and structure of the guide 10 will now be described with further detail. As mentioned above, the guide 10 can include an upward opening funnel 30 to which an elongated barrel 40 can be joined. Although shown as different components, with the upward opening funnel 30 being of a frustoconical configuration and the barrel as a cylindrical element, these components optionally can be integral with one another and indistinguishable in structure. For example, the elongated barrel 40 which is shown as a cylindrical tubular structure, can be seamlessly integrated into the upward opening funnel 30 with the bore transitioning into the side wall 33 of the funnel 30.

As shown however, the lower end 32 of the funnel 30 is joined with an upper end 41 of the elongated barrel 40. The elongated barrel 40 transitions downward, away from the funnel as shown in FIGS. 1-3. The bore 40B can continue downward along the longitudinal axis LA, which also corresponds to a drive path of the fastener 100 as it is advanced through the bore and into an underlying workpiece, through the hole 71H of the clip 70. The bore 40B can extend downward and can be in communication with the guide recess 55 that is defined by the portion of the guide as shown for example in FIG. 2. The elongated barrel 40 optionally can be formed as an integral part of the guide base 50 and can extend upwardly therefrom to the funnel 30. Of course, in some applications, the elongated barrel can include slots, openings or other apertures, depending on the application.

As shown in FIG. 2, the guide base 50 can include a grasping handle 50H. This grasping handle can extend laterally away from the elongated barrel 40, generally away from the longitudinal axis LA. The handle 50 can extend a distance D4 away from the longitudinal axis LA. This distance D4 optionally can be at least 1 inch, at least 2 inches, at least 3 inches, at least 4 inches or other distances depending on the leverage desired to prevent rotation of the guide 10 when a moment or torque M is exerted on the clip by the fastener advancing. Although not shown, the grasping surface 50G of the handle 50 can include multiple contours configured to enable a user to place digits within those contours and further grasp the handle 50H. Further, although shown as a generally linear structure extending laterally away from longitudinal axis LA, the handle 50H can take on other configurations. For example, it can be of a curved configuration or a ball shaped or spherical configuration extending generally from the guide base 50. The handle also can be changed in orientation and configuration such that the guide can be placed in a variety of different locations, adjacent other structures that may have odd and/or irregular configurations.

Returning to FIGS. 1-5, the guide base 50 can define the guide recess 50. The guide recess 50 can extend to the lower surface 50L of the guide base 50. The guide recess 50 can be aligned with and in fluid communication with the bore 40B of the elongated barrel 40. The guide recess can be bounded by a bottom or recess wall 55R. The recess wall 55R can contact or otherwise be placed adjacent the clip base 71 when the clip 70 is installed relative to the guide base 50 as described below. The recess wall 55R can form the upper most portion of the guide recess. The guide recess 55 also can be bounded by a stop wall 55S. The stop wall 55S can extend upward from the recess wall 55R or downwardly from the recess wall 55R. This stop wall 55S optionally can engage the edge 71E of the clip base 71 when that clip base 71 is inserted into the guide recess 55. In some cases, the edge 71E can directly engage the stop wall 55S when the clip base is installed such that the clip axis CA of the fastener hole 71H is aligned with, coincident with and/or parallel to the longitudinal axis LA of the elongated bore 40.

As shown in FIG. 2, the guide recess 55 also can be bounded by sidewalls 55M and 55N, which are disposed on opposing sides of the recess and which optionally can be generally perpendicular to the wall 55S where included. The sidewalls may or may not be continuous and/or connected with one another. Generally, however they can outline a perimeter or border of the guide recess 55. With reference to FIG. 4, the guide recess 55 also can be of a height H. This height H can correspond to the overall thickness T of the clip base 71, which optionally can include the flange 71F that surrounds the fastener hole 71H. The height H can be greater than or equal to the thickness T of the clip. With these dimensions, when the clip base 71 is installed in the guide recess 55, a lower portion of the clip, for example, the flange 71F does not extend beyond the lowermost plane P1 of the guide 10 and guide base 50. This can allow the guide 10 to be placed on the upper surface 106U of the of the underlying workpiece 106, without the clip base 71 or a portion of the flange preventing engagement of the lower surface 50L of the guide or guide base 50 with the upper surface 106U. In turn, this can provide a solid and consistent positioning and holding of the guide 10 against the workpiece 106 when the clip 70 and fastener 100 are installed relative to that workpiece.

In addition, the sidewalls 50M and 50N can engage the opposing side edges 71S of the clip base 71 and/or the clip 70 in general, and can assist and/or constrain the clip 70 from rotating relative to the guide 10 and guide base 50 when the clip is engaged by the fastener head 100H, as the fastener 100 rotates. Indeed, the clip side edges 71S can collide with, contact and/or engage those respective sidewalls 55M and 55N when the fastener 100 and in particular its head 100H engages and exerts a moment Mon the clip base 71 around the hole 71H as described below.

With further reference to FIGS. 1-3, the guide base 50 can define the guide recess 55. The base 50 also can include a forward wall 56 that defines a wall recess 56R. This wall recess 56R can open up to and can be contiguous with the guide recess 55. The guide 50 can include opposing, forwardly extending legs, for example, a first leg 51 and a second leg 52, that extend opposite from or are at some other orientation relative to the grasping handle 50H. These legs can extend to the forward wall 56 and can form at least a portion of the wall recess 56R. When the clip 70 is installed relative to the guide base 50, the clip wall 72 can be placed in or otherwise positioned near the wall recess 56R of the forward wall 56. This placement in the recess can further constrain the clip 70, and can further impair or prevent rotation of the clip when a moment is exerted on it.

The guide 10 optionally can include a retention element 60 that is configured to retain, hold and/or secure the clip 70 relative to the guide 10 before the clip 70 is installed with the guide 10 relative to a work piece. The retention element 60 as shown in FIGS. 1-4, can include a pin 63 that extends outward from a portion of the guide base. The pin 63 can extend in a cantilevered manner from an interior wall 501 of the guide base 50, and optionally can extend over a guide shelf 55K to or within the wall recess 56R. This pin, also referred to as an arm, finger or bar herein, can be a generally flexible, semi-flexible and/or rigid element, and can be sized to fit within a clip gap CG of the clip 70 as shown in FIG. 2, between a clip arm 73 and the clip base 71. The retention element or pin 63 also can include an upper surface 63U and an opposing lower surface 63L. The pin can be sized and shaped also to fit within an optional pinhole 72P defined by the clip 70. This pinhole can have an upper boundary 72U forming a portion of a perimeter of that pinhole.

Figure 5:
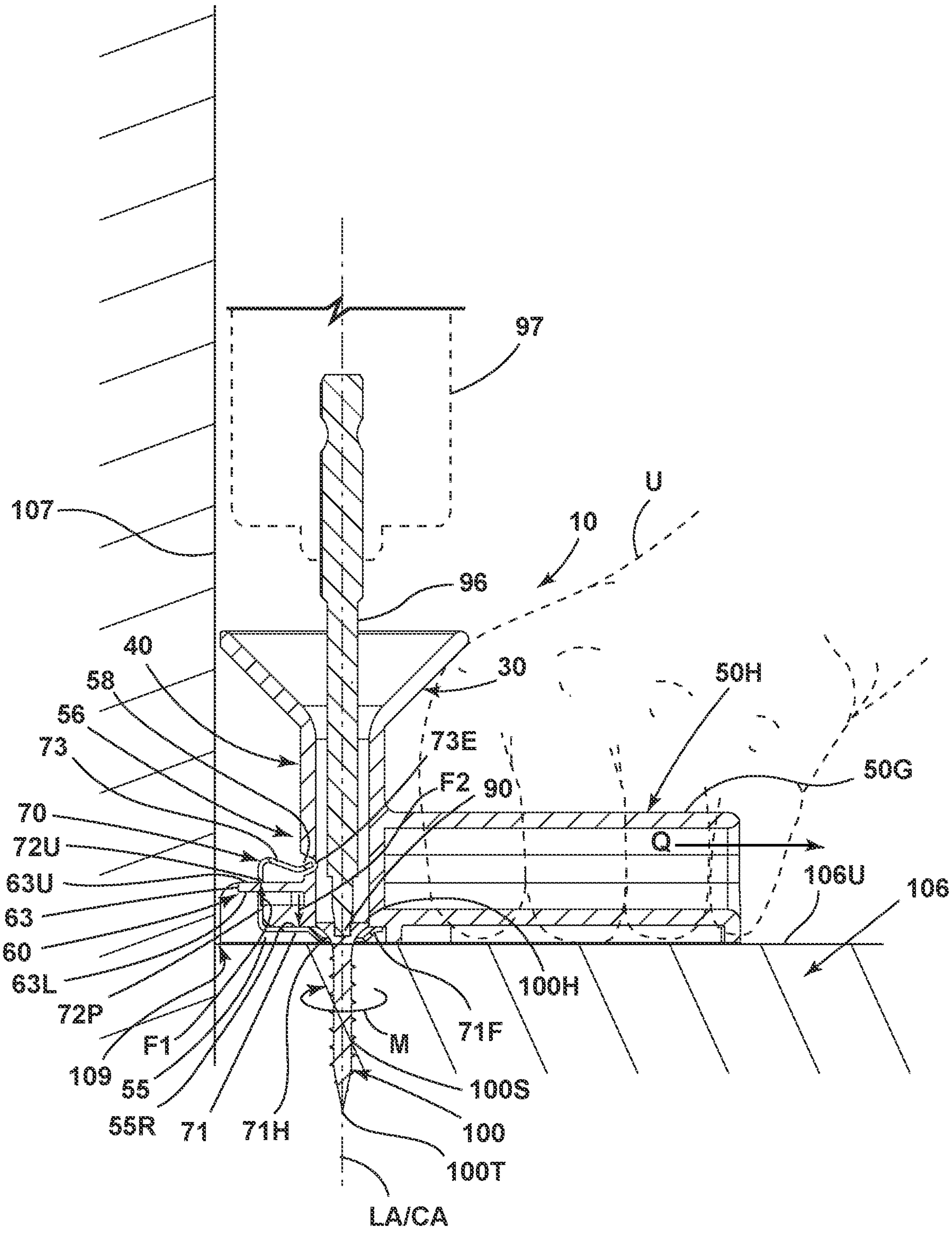
FIG. 5 is a side section view of the fastener guide with a clip installed relative thereto, and a fastener in advanced into an underlying substrate.

Optionally, the pin, and in particular the pin upper surface 63U can engage the perimeter or boundary 72U, and can exert a first force F1 against that upper perimeter or other perimeter 72U of the pinhole 72P which in turn can align and lead the clip base 71 further into the guide recess 55. Optionally, the pin exerts an upward force, generally perpendicularly to its length on the clip via interaction with the pinhole and its perimeter. As shown in FIG. 5, the force F1 can be exerted upward on the clip 70 and in particular the perimeter or border of the pinhole 72P. In turn, this urges the clip base 71 into the guide recess 55. The recess wall 55R can exert a corresponding reactive force F2 against the clip base 71, and in particular its upper surface 71U. As a result, the clip base can be sufficiently held within the guide recess 55 such that it can engage the respective walls 55N, 55M and/or 55S surrounding the guide recess, which engagement can impair or prevent rotation of that clip relative to the guide 10 when a moment M is exerted by the fastener 100 on the clip 70 within the guide 10.

Further optionally, the guide base 50 can define a notch 58 within which a portion of the clip arm 73 can fit when the clip is installed relative to the guide. In particular, the clip arm 73 can be disposed in the notch 58 when the clip is installed relative to the guide, and the pin 63 exerts a force against the clip wall 72 or some other part of the clip. The notch 58 can be at least partially defined in the elongated barrel 40 and/or some other portion of the guide base 50. Of course, the notch can be absent, where the clip is of a different configuration and/or dimension.

Turning now to FIGS. 2 and 3, the guide 10 is designed to hold a clip. The clip 70 as mentioned above can include a clip base 71, which can generally be a flat in or planar plate. The clip base 71 can define the fastener hole 71H. The fastener hole can be surrounded by a flange 71F. This flange optionally can be of a frustoconical shape to mate with a corresponding head 100H of the fastener 100 which is shown in FIG. 5. The flange 71F of course can be absent from the clip base 71 or of a different configuration. In some cases, the clip base 71 can be of a sufficient thickness such that the fastener hole 71H can be a frustoconical hole (not shown) drilled in and extending downward from an upper surface 71U of the clip base.

As further mentioned above, the fastener hole 71H can define a clip axis CA. The clip axis CA can be the center of the fastener hole 71H. When installed in the guide recess 55, the clip axis CA can be parallel to, coincident with, and/or aligned with a longitudinal axis LA of the elongated barrel 40 and bore 40B thereof. This can facilitate quick and easy alignment and advancement of the fastener 100 from the bore 40B, through the fastener hole 71H.

With further reference to FIGS. 2 and 3, the clip base 71 can include an end 71E the transitions to the side edges 71S of the clip. The clip base 71 can extend to and transition to a clip wall 72. The clip wall 72 can extend generally upwardly from the clip base 71, and optionally can be at a 90° angle relative to the clip base 71. Of course, the clip wall can be disposed at other angles relative to the clip base. The clip wall 72 can define the pinhole 72P as described above. The clip wall 72 can extend upward from the clip base 71 and can transition to the clip arm 73 that extends backward toward the clip axis CA. Optionally, the clip wall 72 can extend parallel to the clip axis CA, which can be centered on the fastener hole 71H, while the clip arm and clip base can extend transverse to the clip axis CA. The arm 73 optionally can extend in a cantilevered manner from the clip wall 72. The clip arm 73 can extend somewhat downwardly or can be angled downwardly toward the clip base 71 as shown in FIG. 5.

Figure 6:
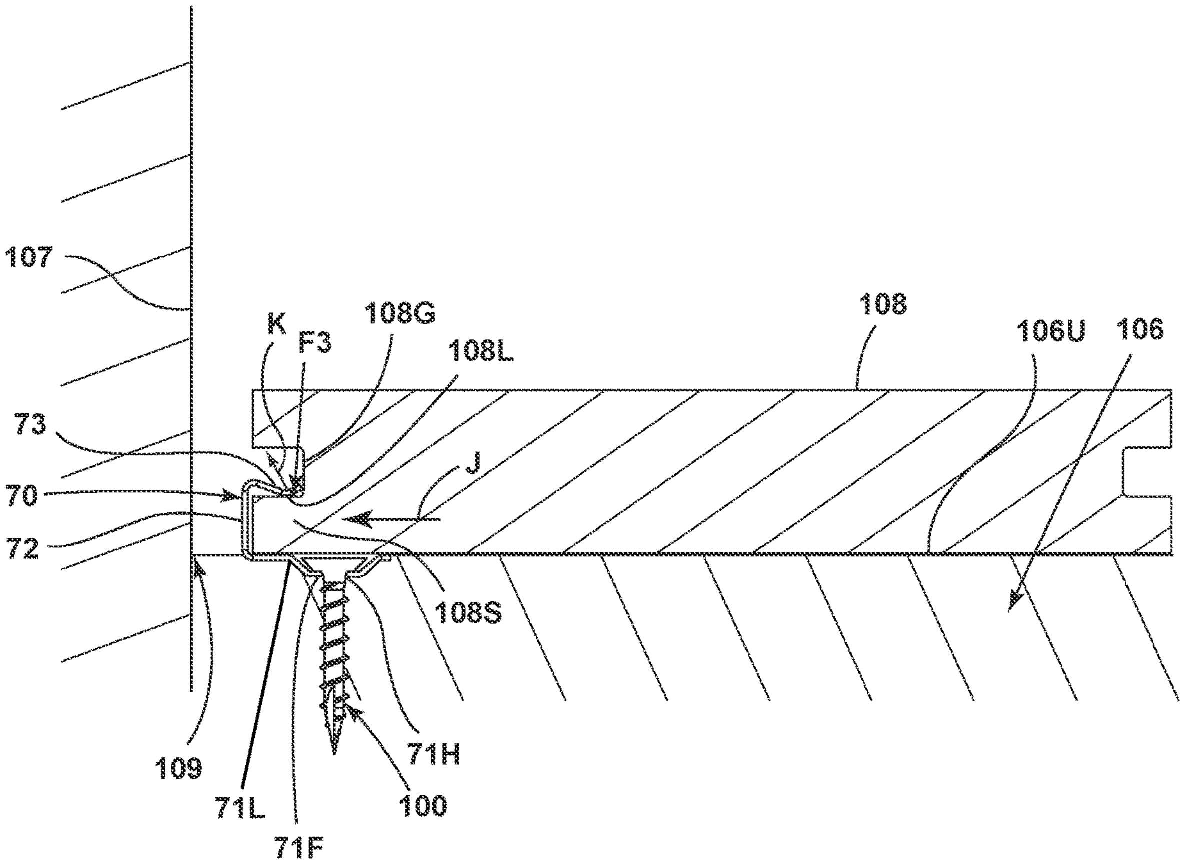
FIG. 6 is a perspective view thereof.
Figure 7:
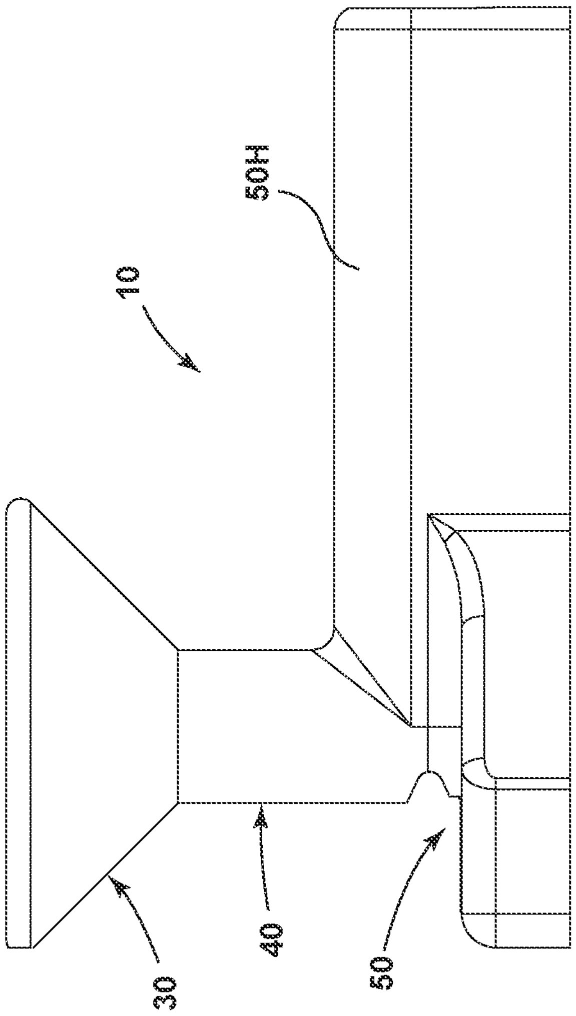
FIG. 7 is a side view of the fastener guide, the opposite side being a mirror image thereof.
Figure 8:
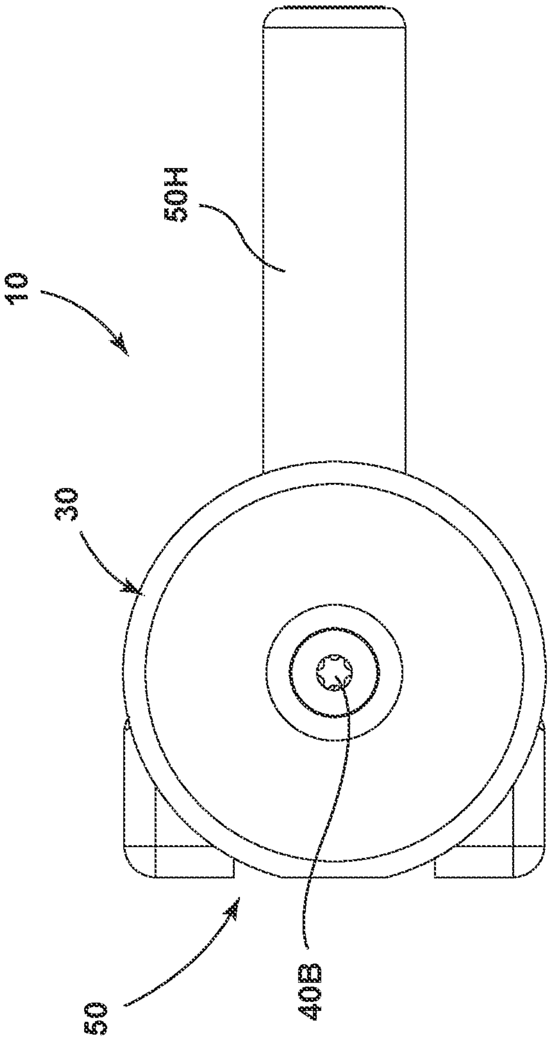
FIG. 8 is a top view of the fastener guide.
Figure 9:
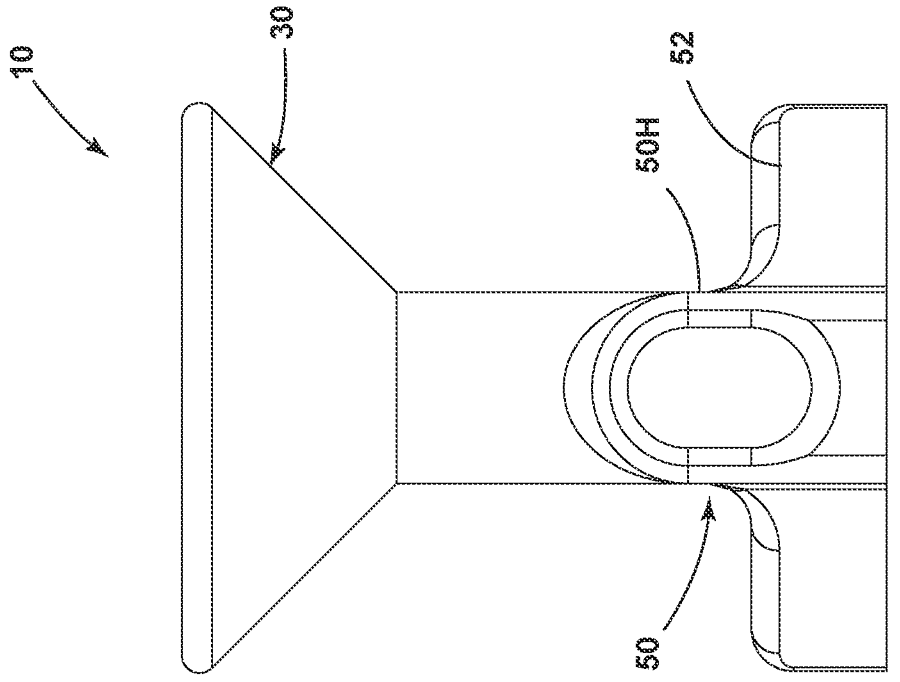
FIG. 9 is a rear view of the fastener guide.
Figure 10:
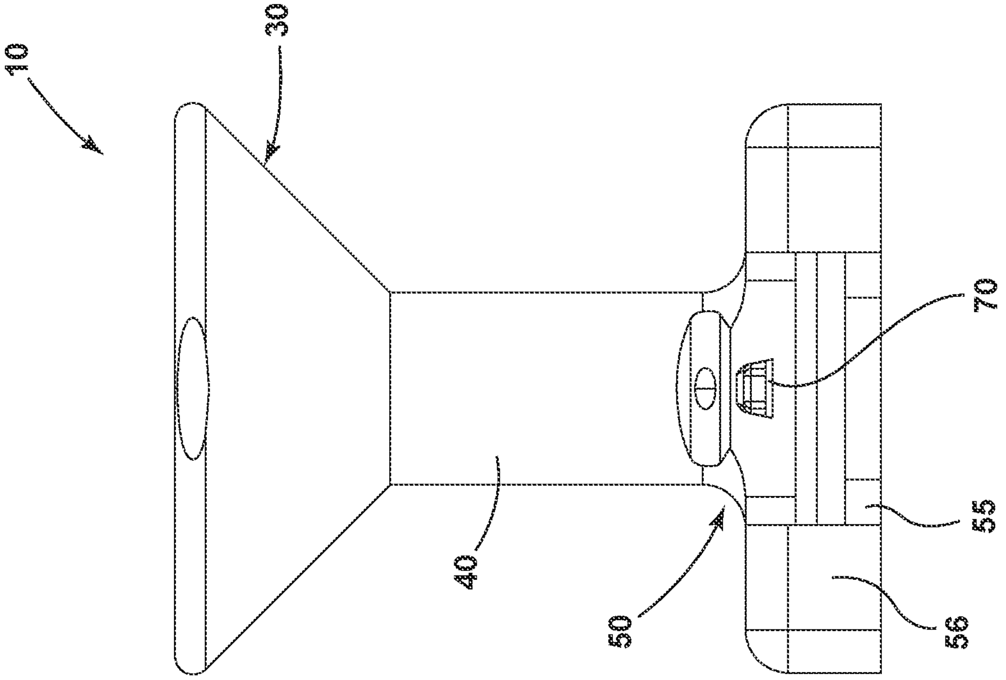
FIG. 10 is a front view of the fastener guide.

Optionally, the clip arm 73 can operate as a spring arm and can be inserted into a groove of a board, and biased, bent or flexed to exert a force on a portion of the groove to hold the board in position relative to the underlying workpiece 106. For example, as shown in FIG. 6, when a board, such as a deck board, flooring board, panel, sheet or other substrate or workpiece 108 is installed relative to the clip 70, the clip arm 73 can be inserted into and enter the groove 108G of the board 108, or over a ledge formed by the board (not shown). The groove can include a lower groove wall 108L. The clip spring arm 73 can initially bend or move upward in direction K when the board 108 is moved in direction J to register that arm within the groove 108G. When this occurs, energy is stored in the clip 70, for example, the arm 73. The clip spring arm 73 thus can be biased to store energy. The clip spring arm 73 can exert a reactive force F3 on the groove 108G, and specifically the lower groove wall 108L as it tries to return to its original, un-sprung, natural position. This force F3 can clamp the lower section 108S of the board 108 between the clip spring arm 73 and the base 71. Thus, the board 108 can be temporarily secured with that force F3 from the clip 72 to the underlying workpiece 106 until additional fasteners or other connection components are installed to join the board 108 with the workpiece 106.

The clip and its components, such as the clip base 71 clip wall 72 and clip arm 73 can be integral or separate components, and can be constructed from a variety of materials. As shown, however, the clip and its components can be constructed from metal, such as steel or other alloys. The metal can be stamped from flat, planar pieces to form the various components such as the base, wall and arm. Any included holes, such as the fastener hole 71H and pinhole 72P can be drilled or otherwise formed in the respective parts of the clip. The flange 71F, when included also can be stamped into the clip base 71. Of course, in other applications, the clip can be constructed from polymers, composites, other materials or combinations of the foregoing and generally shaped, sized and/or formed into a C or U-shaped clip. Further, it is contemplated that the arm 73 can extend different distances and overhang over the clip base 71 in different amounts than those shown. This can be dependent on the application, the holding strength of the clip and/or the type of board with which the clip is used.

Methods of using the starter clip fastener guide 10 of the current embodiment will now be described here. On a high level, one method can include providing the guide 10 including an upward opening funnel 30 with an elongated barrel 40 defining a fastener bore 40B extending downward from the upward opening funnel, the guide base 50 including a handle 50H extending from the base and including a grasping surface 50G configured so a user can grasp and manipulate the guide 10, the guide base 50 defining a guide recess 55 disposed below the elongated barrel 40, and a retention element 60; and installing a clip 70 on the guide so that a clip base 71 enters the guide recess 55. The clip 70 can include the above mentioned clip wall 72 extending upward from the clip base, the clip wall 72 joined with the clip arm 73 that extends over the clip base 71, the clip base 71 defining a fastener hole 71H, the fastener hole 71H being aligned with the fastener bore 40B. The handle 50H can be graspable by a user to impair rotation of the clip as the fastener and clip are installed relative to a workpiece.

The method of using the guide 10 of the current embodiment can include a variety of additional steps, which can be understood with reference to FIGS. 2-6. Starting with FIG. 2, the guide 10 can be provided as shown, with its retention element 60 and guide recess 55. A user can grasp the guide 10 via the handle 50H with one hand, and a clip 70 with the other hand. The user can move the clip 70 toward the guide recess 55 in direction L. The user can align the pinhole 72P with the retention element 60, as shown, a pin 63, while moving the clip 70 in direction L. The pin 63 can enter the pinhole 72 while the clip base 71 enters the guide base 50 and in particular the recess 55. The side edges 71S can move along and/or adjacent the respective sidewalls 55M and 55N within the recess 55. The upper surface 63U of the pin can engage the perimeter 72U and in particular the upper perimeter of the pinhole 72. The user can continue to press the clip 70 into the guide recess 55 and in so doing, the wall 72 can enter the wall recess 56R in the forward wall 56. The interior surface 721 of the clip optionally can engage a shelf 55K that is disposed above the recess 55 and that transitions and/or forms a portion of the recess wall 55R. The shelf 55K optionally can stop or arrest the insertion of the clip base into the guide recess 55. Alternatively or additionally, the engagement of the end 71E with the wall 55S also can arrest and/or stop insertion of the clip base into the guide recess 55.

As the clip 70 is installed relative to the guide base 50, the user can push the clip base 71 further into the guide recess 55 toward the recess wall 55. As this occurs, the clip can engage the pin or retention feature 60. In particular, the perimeter 72U can engage the upper surface 63U of the pin as shown for example in FIG. 5, and can slightly bias that pin so that it begins to bend downward. As a result, the pin 63 also exerts a force F1, which as shown can be upward force, against the pin hole 72P and generally the pin wall 72. Another force F2 is exerted by the guide base 50, in particular, the guide recess wall 55R against the upper surface of the clip base 71. These forces, F1 and F2 can effectively hold the clip joined with the guide 10, until the clip is placed by user relative to a user. The guide also can be used to hold and move the clip around to an appropriate location for placement by the user.

As the clip 70 is installed relative to the guide base 50, the clip arm 73 can be extended above the guide base 50 so that a portion of the guide base, for example, the shelf 55K is disposed between the clip base 71 and the clip arm 73. The pin 63 also can be disposed between the clip arm 73 and the clip base 71 in this configuration as well. Other portions or components of the guide base also can be disposed between the clip arm and the clip base. The clip arm 73 optionally can at least partially enter and optional notch 58 defined by the guide base and/or elongated barrel.

With the clip 70 installed relative to the guide 10, the user can move the clip to a suitable location. As shown in FIG. 4, the location for the clip, which can be a starter clip for a first row board on a floor or deck frame, can be at an outer edge or surface 109 of the work piece 106. If there is a wall or other structure 107 disposed at the outer edge 109, the user can engage the forward wall 56 of the guide base 50 against it. In turn, this can establish a predetermined distance D6 of the longitudinal axis LA and/or clip axis CA from that structure or generally from the edge or end 109 of the workpiece 106. If there is no structure 107, the user can simply align the forward wall 56 with the outer edge or end 109 of the workpiece 106. Of course, in some applications, the user may want the clip 70, in particular the vertical wall 72, aligned directly vertically above that outer edge or end 109. Accordingly, the user can overhang the forward wall 56 over that part for appropriate placement of the clip and the respective longitudinal axis LA and clip axis CA.

Referring to FIG. 4, with the clip 70 disposed in the guide 10, and the clip 70 optionally adjacent or engaging the upper surface 106U of the workpiece 106, the user can deposit a fastener 100 into the upward opening funnel 30. The fastener 100 will fall via the force of gravity downward into the position shown there, with the head 100H optionally resting against the sidewall of the bore 40B. The tip 100T can fall downward and engage a portion of the clip and/or the upper surface 106U of the workpiece 106. The fastener can project downward into the fastener hole 71H defined by the clip base. The fastener 100 optionally can lay along and align with the longitudinal axis LA and the clip axis CA. The user can then move a tool 97 such that the bit 96 also enters the upward opening funnel 30. The drive feature 90 can be guided toward the head 100H of the fastener via the sidewall of the funnel so the drive feature 90 registers with the aperture 100A that matches the drive feature 90. The user can operate the tool 97 to rotate the bit 96, the drive feature 90 and thus the fastener 100.

As the fastener 100 is rotated, it begins to advance along the longitudinal axis and clip axis. With reference to FIG. 5, the fastener tip and shaft can pass through the fastener hole 71H as the bit 96 advances into the elongated barrel 40. This continues until the head 100H of the fastener 100 engages the clip. In the example shown, the head 100H can engage the clip base 71 and/or the clip flange 71F. As this occurs, the head pulls the clip downward into the workpiece 106. In some cases, where the work piece 106 is constructed from wood, the flange 71F can bite into and penetrate that upper surface 106U as it is being pulled downward until the lower surface 71L of the clip base 71 around the flange 71F engages the upper surface 106U and that surrounding area. As this occurs, the rotation of the bit in the fastener 100 can exert a torque or moment M on the clip 70. Optionally this torque or moment can be at least 1 foot pounds, at least 2 foot pounds, at least 3 foot pounds, at least 4 foot pounds, at least 5 foot pounds, at least 10 foot pounds, at least foot pounds, at least 20 foot pounds or other torques or moments, depending on the tool and the fastener. As a result of this moment M, the clip can be urged to rotate in the direction of the moment. However, due to the clip being installed in the guide 10, the clip is restrained from rotating. As mentioned above, the clip side edges 71S of the clip base 71 can engage the respective sides 55M and 55N, as well as end 71E engaging the wall 55S, which in turn can prevent the clip from rotating. Of course, the clip wall 72 also can engage the first and second arms or legs 51, 52 of the guide base 50 which can prevent rotation additionally or alternatively. The shelf 55K can act to prevent rotation due to the exerted moment M. With this control of the moment and placement of the clip, the clip can be mounted in a selected orientation relative to the upper surface 106U of the workpiece 106 and any adjacent structure 107.

After the clip 70 is fastened down with the fastener 100, a user can remove the bit 96 and drive feature 90 from the fastener and from the elongated barrel 40, as well as the funnel 30. The user U can slide the guide 10 laterally in direction Q as shown in FIG. 5. As this occurs, the pin 63 exits the pinhole 72P, and the shelf can disengage the clip wall. The clip 50 also can exit the guide recess and the wall recess, optionally with the clip base moving relative to the sidewalls 55M and 55N, and away from the wall 55S. The clip 70 can move away from the shelf 55K. The user can then cleanly remove the guide 10 from the clip 70 and can load another clip relative to that guide to install that new clip on another workpiece distal from the workpiece 106. This process can be repeated to install multiple clips on multiple workpieces, such as joists along a deck frame.

With the one or more starter clips installed relative to the workpieces, the user U can install a board 108 relative to an installed clip 70 as shown in FIG. 6. There, and as described above, the user can move the board 108 in direction J such that the clip arm 73 enters groove 108G. As described above, the clip arm 73 can exert a force F3 on the board within the groove 108G to hold the board relative to the upper surface 106U of the workpiece 106. One or more additional clips or other fasteners, whether hidden fasteners or other types of fasteners, can be used to further secure the board and additional adjacent boards to the workpiece or joist 106.

Figure 11:
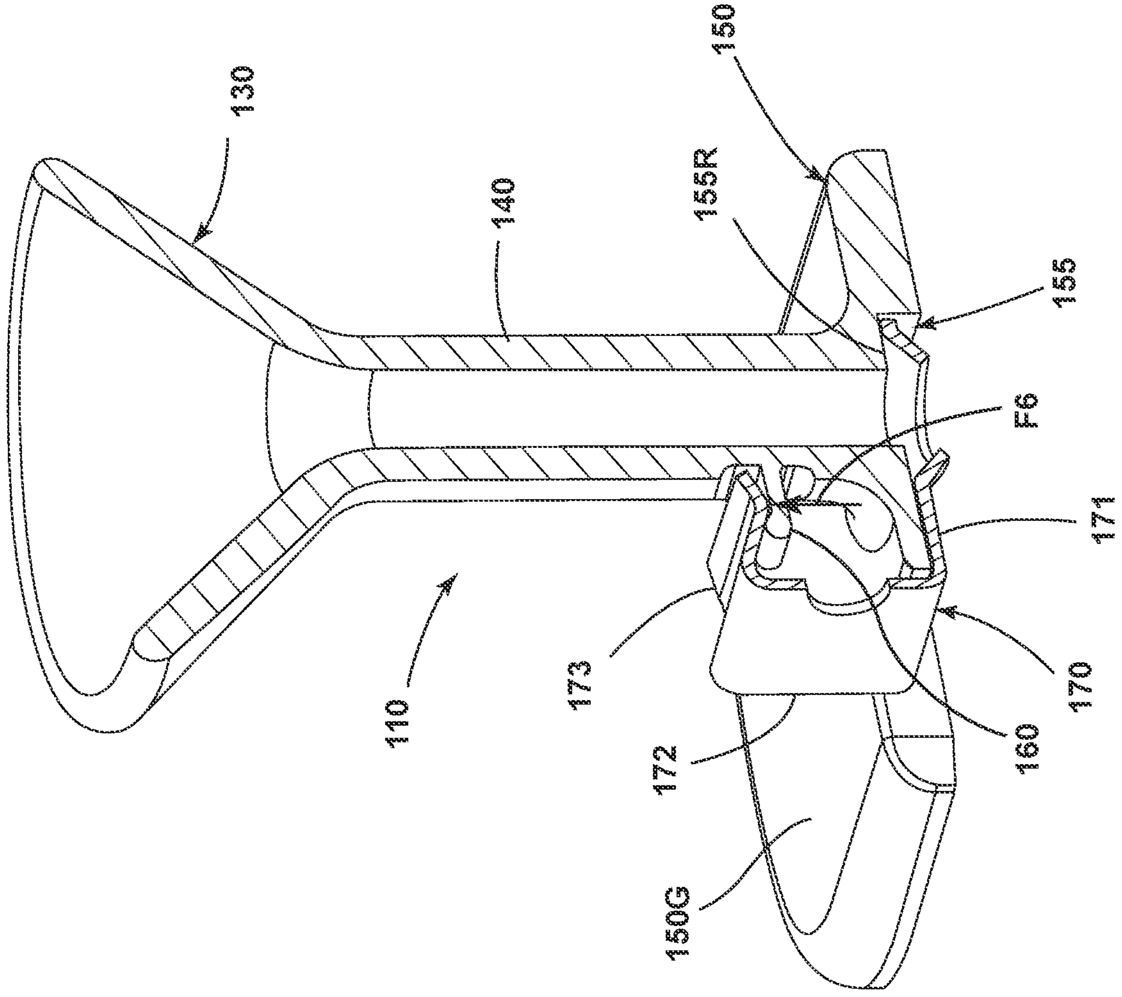
FIG. 11 is a first alternative embodiment of the fastener guide with a clip installed relative thereto.

A first alternative embodiment of the starter clip guide is shown in FIG. 11 and generally designated 110. This embodiment is similar to the embodiment above in structure, function and operation with several exceptions. For example, this guide 110 can include an upward opening funnel 130 joined with an elongated barrel 140. The elongated barrel 140 can extend down to the guide base 150. The guide base 150 can include a grasping area 150G, which differs from the grasping handle of the embodiment above but nonetheless can be grabbed by a user to prevent rotation of the clip 170 when a fastener is installed therethrough and advanced into an underlying workpiece. The guide base 150 and retention element 160 in this embodiment can differ from the embodiment. For example, the retention element 160 can be the form of a flexible arm or finger that extends outward from a portion of the elongated barrel 140. This flexible arm can push upward with the force F6 against the underside of the clip arm 173. As a result, the clip base 170 can be lifted upward into the guide recess 150 and urged against the recess wall 155R therein. This lifting force F6 can retain the clip 170 in a fixed orientation relative to the guide base 150 for installation. The installation of the clip relative to the guide, installation of a fastener relative to the clip and guide, and use of the guide with a board or other workpiece can be similar to that of the current embodiment above and will not be described again here.

Figure 12:
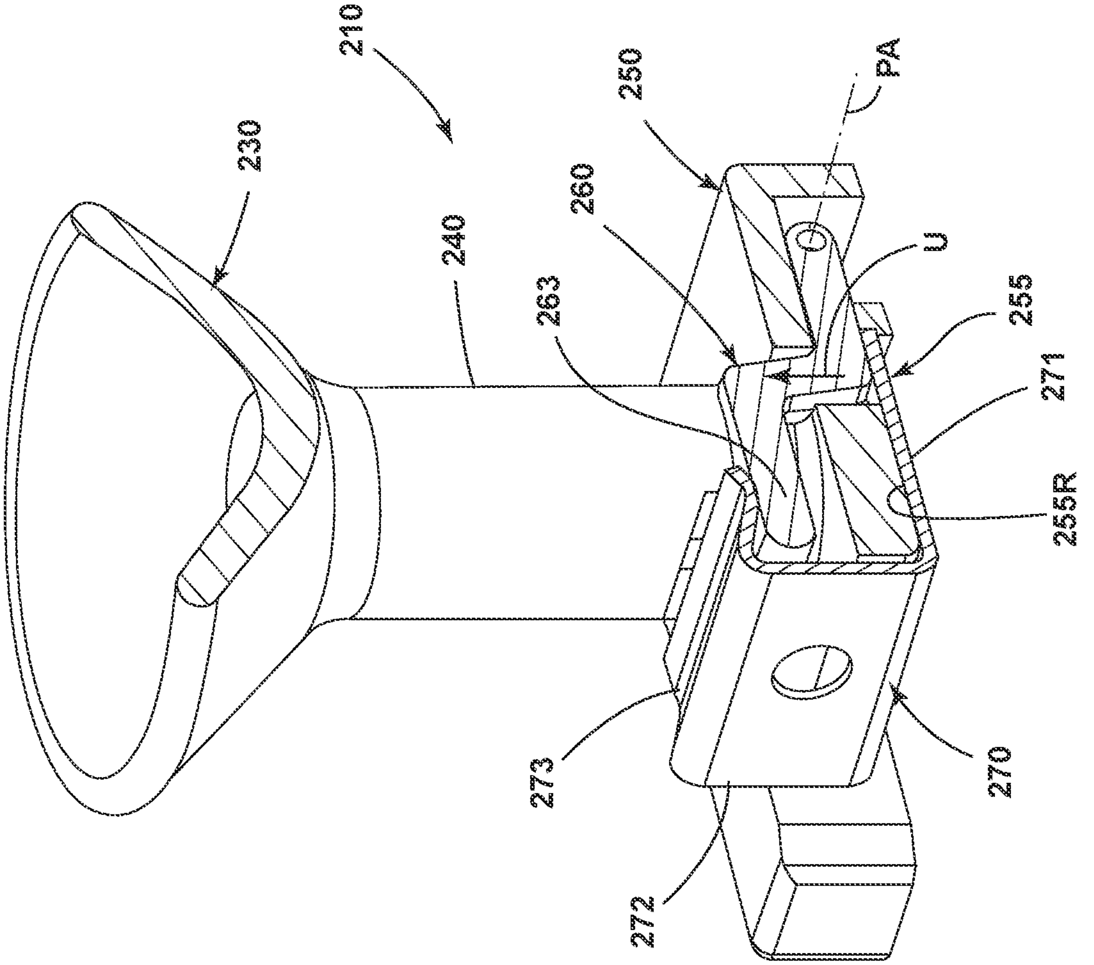
FIG. 12 is a second alternative embodiment of the fastener guide with a clip installed relative thereto.

A second alternative embodiment of the starter clip guide is shown in FIG. 12 and generally designated 210. This embodiment is similar to the embodiment above in structure, function and operation with several exceptions. For example, this guide 210 can include an upward opening funnel 230 joined with an elongated barrel 240 that extends to a guide base 250. The clip 270 can be similar to that of the embodiments above. The guide base 250 however can differ and can include a different type of retention element 260. This retention element 260 can be in the form of an arm 263 that can pivot about a pivot axis PA. This arm to 63 can normally be biased upward in direction U via a spring or other element. When the clip 270 is installed relative to the guide recess 255, the clip base 271 enters that recess 255 and the clip arm 273 engages the arm 263. The arm 273 exerts a biasing force upward in direction U thereby pushing the clip arm 273 upward which in turn pulls the clip base 271 into contact with the underside of the guide base and its recess wall 255R in the guide recess 255. The installation of the clip relative to the guide, installation of a fastener relative to the clip and guide, and use of the guide with a board or other workpiece can be similar to that of the current embodiment above and will not be described again here.

Figure 13:
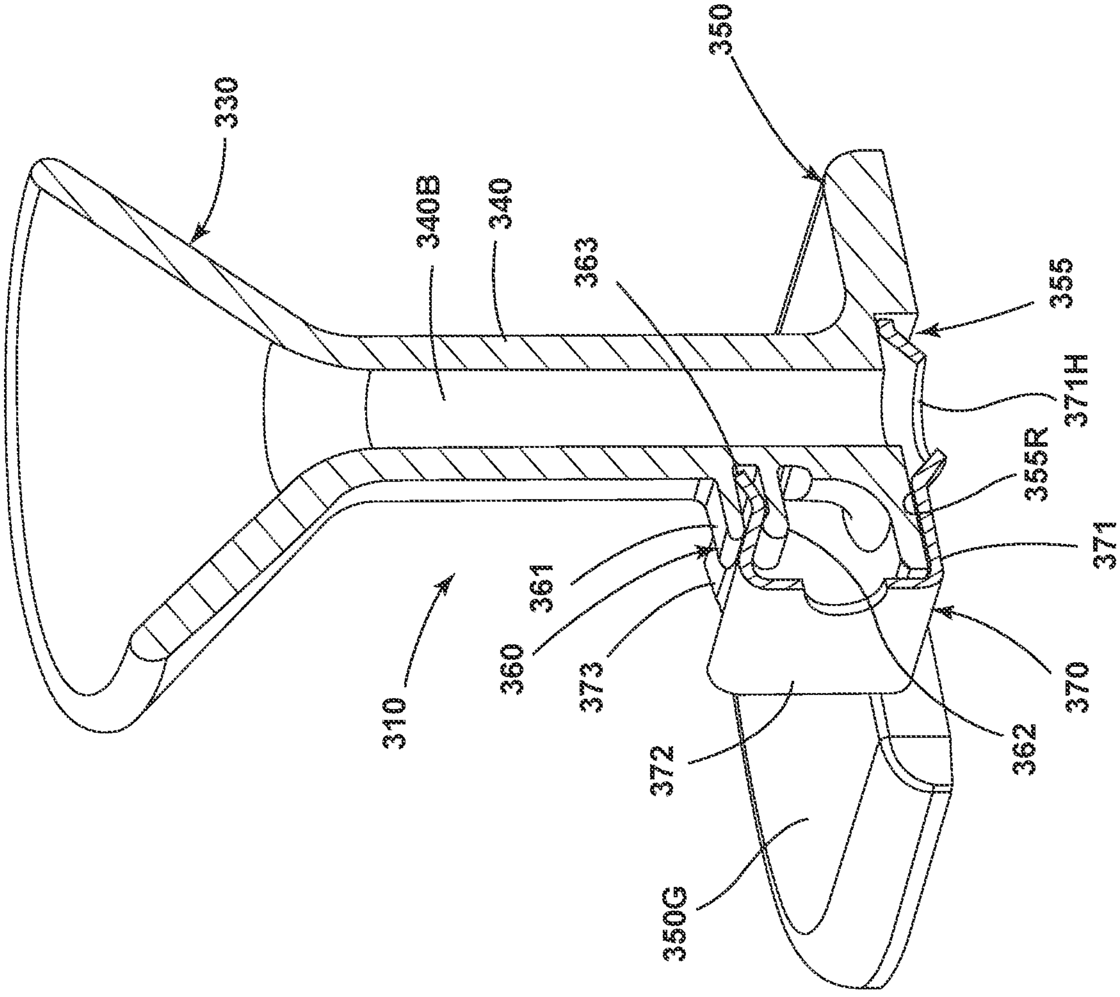
FIG. 13 is a third alternative embodiment of the fastener guide with a clip installed relative thereto.

A third alternative embodiment of the starter clip guide is shown in FIG. 13 and generally designated 310. This embodiment is similar to the embodiment above in structure, function and operation with several exceptions. For example, this guide 310 can include an upward opening funnel 330 that is joined with an elongated barrel 340 which extends to the guide base 350. The guide base 350 in this embodiment can differ from the embodiments above and can include retention element 360 having first 361 and second 362 fingers. These fingers can be separated and can form a clip arm recess 363. The clip arm 373 can be disposed in the recess 363. The fingers 361 and 362 can capture the arm 373 therebetween. Thus, the end of the arm 373 is trapped within and between those fingers 361 and 362, within the recess 363. This trapping of the arm 373 thereby secures the clip 372, the guide base 350, such that the clip base 371 is disposed in the guide recess 355 and the fastener hole 371H is aligned with the bore 340B of the elongated barrel 340. The installation of the clip relative to the guide, installation of a fastener relative to the clip and guide, and use of the guide with a board or other workpiece can be similar to that of the current embodiment above and will not be described again here. Optionally however, the second or lower finger 362 can flex downward when a fastener is installed relative to the clip 370 and the clip is pulled downward, toward a work piece. When the finger 362 is bent downward, it opens up the recess 363 so that the arm 373 can be easily removed from that recess 363, for example, when the guide 310 is slid or moved such that the clip exits the guide recess 355.

Figure 14:
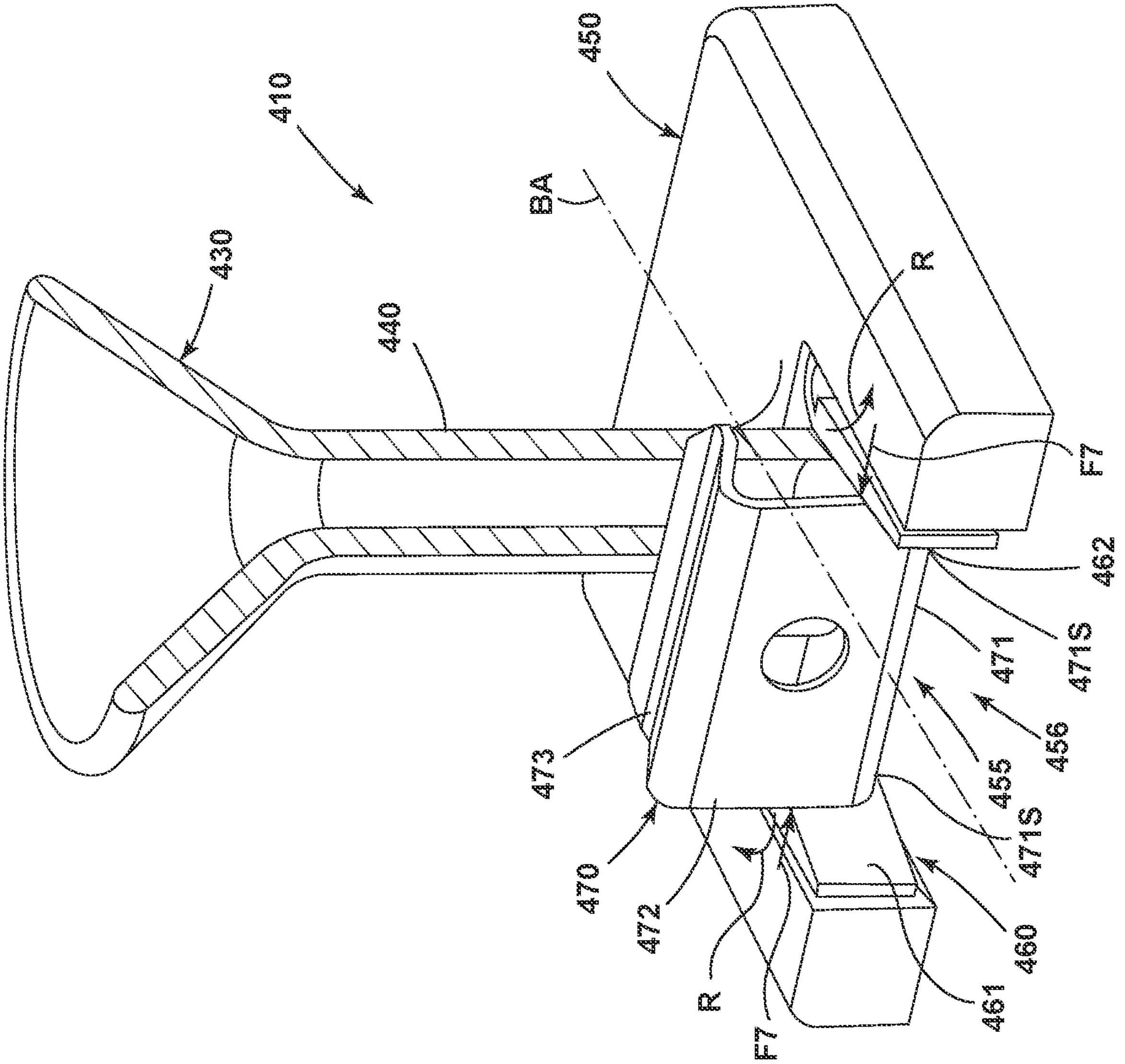
FIG. 14 is a fourth alternative embodiment of the fastener guide with a clip installed relative thereto.

A fourth alternative embodiment of the starter clip guide is shown in FIG. 14 and generally designated 410. This embodiment is similar to the embodiment above in structure, function and operation with several exceptions. For example, this guide 410 can include an upward opening funnel 430 joined with an elongated barrel 440 that extends to and is connected with a guide base 450. The clip 470 can be similar to the clips above as well. The guide base 450 can differ from the embodiments above and can include a different retention element 460. That retention element 460 can include first and second arms 461, 462 that are disposed within a wall recess 456 defined by the guide base 450. These first and second arms 461 and 462 can be configured to extend inwardly toward a base axis or plane BA that bisects the guide base. When the clip enters the guide recess 455 and the wall recess 456, the side edges 471S of the clip base 471 can press against those arms 461 and 462 and urge them in directions R, generally away from the base axis or plane BA. As this occurs, the arms 461 and 462 exert a reactive force F7 against those side edges and the edges of the clip wall 472. As a result, the reactive force F7 holds the clip 470 in the guide recess 455 and wall recess 456. This in turn secures the clip 470 to the guide base 450 and the guide 410 in general. The installation of the clip relative to the guide, installation of a fastener relative to the clip and guide, and use of the guide with a board or other workpiece can be similar to that of the current embodiment above and will not be described again here.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered element. The same is true for the naming of any other elements in the form of a first element, second element, third element, etc. as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of using a guide, the method comprising:

providing a guide including an upward opening funnel having an upper end and a lower end, with an elongated barrel extending downward from the lower end to a guide base, the guide base including a handle extending laterally from the guide base and including a grasping surface configured so a user can grasp and manipulate the guide, the guide base defining a guide recess disposed below the elongated barrel; and installing a clip on the guide so that a clip base enters the guide recess, the clip including a clip wall extending upward from the clip base, the clip wall joined with a clip arm that extends over the clip base, the clip base defining a fastener hole, the fastener hole aligned with the elongated barrel, wherein the clip arm, clip base and clip wall form a C shape, wherein the clip wall extends vertically between the clip base and the clip arm, wherein the clip base includes a clip base end and extends laterally from the clip wall, wherein the clip arm includes a clip arm end and extends laterally from the clip wall, wherein the clip base end extends laterally farther from the clip wall than the clip arm end on a same side of the clip wall as the clip arm end, wherein the guide base includes a retainer extending outward from the guide base, wherein the retainer engages the clip and secures the clip to the guide, wherein the retainer includes a pin extending from the guide base, wherein the clip defines a pin hole in the clip wall, wherein the pin extends completely through the pin hole, from one side of the clip wall to an opposing side, thereby extending through the clip wall and projecting therefrom on the opposing side whereby the handle is graspable by a user to impair rotation of the clip as the clip is installed relative to a workpiece.

2. The method of claim 1, comprising:

exerting an upward force on a perimeter of the pin hole with the pin to move the clip base into the recess toward a recess wall.

3. The method of claim 1, comprising:

installing the clip on the guide so at least a portion of the guide base is disposed between the clip base and the clip arm, installing a fastener past the clip arm, without engaging the clip arm, through a fastener hole defined by the clip base, wherein a fastener head engages only the clip base, without engaging the clip arm, upon installation of the fastener relative to the clip and an underlying work piece.

4. The method of claim 1, wherein the guide base includes a forward wall having a wall recess that opens to the guide recess, wherein the installing includes placing the clip wall in the wall recess of the forward wall of the guide.

5. The method of claim 4, comprising:

extending the clip arm above the guide base and the wall recess so that a portion of the guide base is disposed between the clip base and the clip arm.

6. The method of claim 5, wherein the clip base includes a frustoconical flange extending around the fastener hole, wherein the clip arm is disposed above the fastener hole, wherein a fastener installed relative to the clip passes by the clip arm without engaging the clip arm, wherein the fastener engages the clip only at the clip base.

7. The method of claim 1 comprising:

extending the clip arm toward the elongated barrel without the clip arm obstructing a fastener bore within the elongated barrel; and positioning the clip base so that the clip base extends under the fastener bore, with the fastener hole aligned with the fastener bore.

8. The method of claim 1 comprising:

placing a fastener in the funnel so that the fastener projects at least partially through the fastener hole defined by the clip base;

rotating the fastener so that the fastener advances into a workpiece;

engaging a perimeter of the clip base around the fastener hole so that the clip is secured to the workpiece; and sliding the guide base relative to the clip secured to the work piece laterally so that the clip exits the guide recess and the guide is removed from the clip, fastened to the workpiece with the fastener.

9. A method of using a guide, the method comprising:

providing a guide including an upward opening funnel with an elongated barrel defining a fastener bore extending downward from the upward opening funnel, and a guide base including a handle extending from the guide base and including a grasping surface configured so a user can grasp and manipulate the guide, the guide base defining a guide recess disposed below the elongated barrel, and a retention element;

installing a clip on the guide so that a clip base enters the guide recess, passing a forward wall, the clip including a clip wall extending upward from the clip base, the clip wall joined with a clip arm that extends over the clip base, the clip base defining a fastener hole, the fastener hole aligned with the fastener bore;

pushing the guide base against a structure vertical wall so that the forward wall engages the structure wall to establish a distance between the structure vertical wall and a clip axis;

providing a pin hole in the clip wall; and projecting a pin completely through the pin hole, so that the pin projects through the clip wall from one side of the clip wall, to and beyond an opposing side of the clip wall, to exert a force on the clip and retain the clip on the guide with the clip base disposed in the guide recess, whereby the handle is graspable by a user to impair rotation of the clip as the clip is installed relative to a workpiece.

10. The method of claim 9 comprising:

extending the clip arm above the guide base so that a portion of the guide base is disposed between the clip base and the clip arm, wherein the clip arm, clip base and clip wall form a C shape, wherein the clip base includes a clip base end, wherein the clip arm includes a clip arm end, wherein the clip base end extends farther from the clip wall than the clip arm end.

11. The method of claim 9 comprising:

wherein the force is an upward force exerted on a perimeter of the pin hole that urges the clip base into the guide recess and against a recess wall within the guide recess.

12. The method of claim 9, comprising:

installing a fastener in the upward opening funnel so that the fastener falls under the force of gravity into the fastener bore and projects downward into the fastener hole defined by the clip base; and rotating the fastener so that the fastener enters a workpiece, with a head of the fastener drawing the clip base against the workpiece.

13. The method of claim 12, comprising:

holding the handle of the guide so that the clip is impaired from rotating with the fastener while the fastener is rotated.

14. The method of claim 9 comprising:

rotating a fastener in the elongated barrel so that the fastener forces the clip base against a workpiece; and holding the handle of the guide so that the clip is impaired from rotating with the fastener while the fastener is rotated.

15. A clip fastener guide comprising:

an upward opening funnel having an upper end and a lower end;

an elongated barrel joined with the lower end;

a guide base joined with the elongated barrel, the guide base including a handle extending from the guide base with a grasping surface configured so a user can grasp and manipulate the guide, the guide base defining a guide recess disposed below the elongated barrel;

clip joined with the guide so that a clip base is disposed in the guide recess, the clip including a clip wall extending upward from the clip base, the clip wall joined with a clip arm that extends over the clip base, the clip base defining a fastener hole, the fastener hole aligned with the elongated barrel when the clip base is disposed in the guide recess;

a pin projecting from the guide base; and a pin hole defined by the clip, wherein the clip arm, clip base and clip wall form a C shape, wherein the clip wall extends vertically between the clip base and the clip arm, wherein the clip base includes a clip base end and extends laterally from the clip wall, wherein the clip arm includes a clip arm end and extends laterally from the clip wall, wherein the clip base end extends laterally farther from the clip wall than the clip arm end on a same side of the clip wall as the clip arm end, wherein the pin extends completely through the pin hole defined by the clip, so that the pin projects through the clip wall from one side of the clip wall, to and beyond an opposing side of the clip wall, wherein the pin exerts a force against the clip to urge the clip base into the guide recess, whereby the handle is graspable by a user to impair rotation of the clip as the clip is installed relative to a workpiece.

16. The clip fastener guide of claim 15, wherein the clip arm is above the guide base so that a portion of the guide base is disposed between the clip base and the clip arm.

* * * * *